United States Patent Office 3,247,155
Patented Apr. 19, 1966

3,247,155
STABILIZERS AND PLASTICIZERS FOR POLYMERS WHICH CONTAIN CHEMICALLY COMBINED CHLORINE
Günter Frank and Richard Wegler, Leverkusen, and Wilhelm Göbel, Cologne-Flittard, Germany, assignors to Farbenfabriken Bayer Aktiengesellschaft, Leverkusen, Germany, a German corporation
No Drawing. Filed Mar. 12, 1963, Ser. No. 264,718
Claims priority, application Germany, Mar. 17, 1962, F 36,299
14 Claims. (Cl. 260—30.4)

This invention relates to compounds useful as stabilizers and plasticizers in halogen containing polymers.

A number of compounds containing epoxide groups have been proposed as stabilizers for polymers which contain chlorine, for example chlorinated rubber, polyvinylidene chloride or polyvinyl chloride; these compounds sometimes have, at the same time, plasticizing properties.

Examples of such compounds are esters of relatively highly unsaturated fatty acids, the double bonds of which have been epoxidised. One disadvantage of these compounds is that the epoxidation is incomplete and the unsaturated fraction that is not epoxidised readily exudes. On the other hand, it is known that the epoxide group changes during the stabilisation process into a chlorohydrin group and, acordingly, the compatibility with the polymer is again partially lost.

In comparison with unsaturated oils, completely epoxidised oils have higher melting points and show accordingly a tendency to crystallise at low temperatures thereby considerably impairing the mechanical values.

It has now been found that glycidyl ethers of hydroxyaryl carboxylic acid esters of the general formula

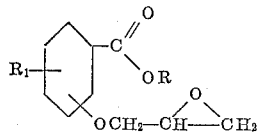

wherein R represents a hydrocarbon radical with 4 to 18 carbon atoms and $R_1$ represents hydrogen or hydrocarbon radicals with 1 to 4 carbon atoms, are very suitable as stabilisers and plasticisers for polymers which contain chlorine.

The compounds used acording to the invention can be prepared from the corresponding hydroxyaryl carboxylic acid esters by reaction with epihalohydrin or dihalohydrin in the presence of alkali metal hydroxide either as solid or as aqueous, concentrated solutions, possibly in the presence of such inert solvents as hydrocarbons, chlorinated hydrocarbons or, advantageously, secondary or tertiary alcohols. Generally, at least one mol of a halohydrin, but preferably an excess thereof, is used to 1 mol of the hydroxaryl carboxylic acid ester. The alkali metal hydroxide is preferably used in equivalent quantities, based on the hydroxyaryl carboxylic acid ester.

The process can for example be carried out by dissolving the corresponding hydroxyaryl carboxylic acid in an excess of an alcohol, introducing hydrogen chloride gas at 60 to 120° C., and, after freeing the reaction mixture from the HCl, distilling off the excess alcohol. The resulting ester itself can easily be purified by distillation if required. To transform the ester which contains phenol groups into the epoxide, 1 mol of the ester is dissolved in 100 to 400 cc. of tertiary alcohol. It is advantageous to use 10 mols of epichlorhydrin to 1 mol of ester. 50% aqueous alkali (1 mol) is added dropwise at temperatures from 80 to 100° C., but it is also possible to use solid alkali. It was surprising that the etherification proceeded so smoothly, without saponification of the ester group. The esters containing epoxide groups are colourless or slightly yellowish liquids.

A comparison of the plasticisers and stabilisers according to the invention with the usual plasticisers shows an excellent resistance to further tearing and no decrease in the mechanical values after being kept for a relatively long time in water at 80° C. They satisfy also the most important condition for a plasticiser of having satisfactory compatibility at low and high temperatures. The compounds according to the invention can be used in admixture with other plasticers.

The following compounds are for example suitable for the process according to the invention: the glycidyl ethers of o-, m-, p-hydroxybenzoic acid butyl ester, isooctyl ester, dodecyl ester, stearyl ester, the glycidyl ethers of o-, m-, p-cresotic acid butyl ester or isooctyl ester, and the glycidyl ethers of 2-hydroxy-5-t.-butyl benzoic acid butyl ester.

Since the degradation produces forming during the stabilisation process are also compatible with the polymers containing chlorine, the plasticising property of the compounds according to the invention is maintained.

The following compounds can for example be used as polymers which contain chlorine: polyvinyl chloride, polyvinylidene chloride, vinyl chloride/vinyl acetate copolymers, vinylidene chloride/vinyl chloride polymers or chlorinated rubber.

The compounds used according to the invention can be added to these chlorine-containing polymers in quanties of 1–50% by weight, advantageously 1–10% by weight.

Example 1

(a) 60 parts by weight of a vinyl chloride polymer (K value 70), prepared by suspension polymerisation, are worked with 37 parts by weight of dioctyl phthalate and 3 parts by weight of p-glycidyl benzoic acid butyl ester for 10 minutes on a mixing roll stand heated to 160° C. to form a foil which is thereafter heated at 170° C. A foil containing none of the glycidyl compound and with altogether 40 parts by weight of dioctyl phthalate already shows a brown colouring after being heated for 60 minutes, the foil stabilised with the compound according to the invention showed no discolouration after the same time.

(b) The p-glycidyl benzoic acid butyl ester is obtained as follows:

820 g. (4.23 mol.) of p-hydroxybenzoic acid butyl ester, 850 cc. of isopropanol and 1950 g. (21.2 mol) of epichlorhydrin are heated to boiling point. A solution of 169 g. (4.23 mol.) of NaOH in 1060 cc. of water is run in over 1 hour and condensation takes a further 2 hours. The lower aqueous phase is separated and the isopropanol and excess epichlorhydrin are distilled off. The residual is taken up in 800 cc. of benzene, washed with saturated common salt solution, buffered by addition of primary sodium phosphate to a pH of 5, the aqueous phase is separated and freed by distillation from the benzene. The 4-epoxypro-poxy benzoic acid butyl ester is freed by filtration from the last traces of common salt. Yield: 962 g., epoxide equivalent: theoretical 250; found 288. Viscosity: 125 cp. at 20° C.

Example 2

(a) A vinyl chloride polymer (K value 70), prepared by suspension polymerisation and which contains 2 parts by weight of barium/cadmium laurate, becomes brown in colour after a rolling time of 10 minutes at 165° C. and subsequent heating at 170° for 15 to 20 minutes, whereas only a slightly yellowish discolouration can be detected if 3 parts by weight of p-glycidyl benzoic acid octyl ester are included in addition to the 2 parts by weight of barium/cadmium compound, after heating for 90 minutes. If the specimen thus-stabilised is exposed for 100 hours to the light of a xenon-high pressure lamp (original Hanau), no decomposition phenomena can be detected.

(b) The p-glycidyl benzoic acid octyl ester is obtained as follows: 550 g. (2.2 mol.) of p-hydroxybenzoic acid isooctyl ester, 440 cc. of isopropanol and 1010 g. (11 mol.) of epichlorhydrin are heated to boiling point. A solution of 88 g. (2.2 mol.) of NaOH in 550 cc. of water is run in over 1 hour and condensation is continued for a further 2 hours. The lower aqueous phase is separated and isopropanol and excess epichlorhydrin are distilled off. The residue is taken up in 400 cc. of benzene, washed with saturated common salt solution, buffered by addition of primary sodium phosphate to a pH of 5, the aqueous phase is separated and freed from benzene by distillation. The p-epoxypropoxy benzoic acid isooctyl ester is freed by filtration from the last traces of common salt. Yield: 665 g., epoxide equivalent theoretical: 306; found 367.$\eta_{20}$:2000 cp.

*Example 3*

100 parts by weight of a vinyl chloride polymer of K value 70, which is prepared by suspension polymerisation and which contains 2 parts by weight of barium/cadmium laurate, have added thereto 3 parts by weight of one of the epoxide compounds (a to d) as indicated below and, after rolling for 10 minutes at 165° C., are heated at 170° C. Whereas a specimen without the additives a to d shows a brown colouring after being heated for 15 to 20 minutes, this only occurs after 50 to 90 minutes with the specimens containing the epoxide compounds. If the specimens, thus-stabilised, are exposed for 100 hours to the light of a xenon high-pressure lamp (original Hanau), no decomposition phenomena can be detected.

The following are added:

(a) 2-epoxypropoxy-5-t.-butyl benzoic acid butyl ester
(b) 2-epoxypropoxy-5-t.-butyl benzoic acid isooctyl ester
(c) 2-epoxypropoxy benzoic acid isobutyl ester
(d) 2-epoxypropoxy benzoic acid amyl ester.

The glycidyl ethers as used above are obtained as follows:

(a) 2-epoxypropoxy-5-t.-butyl benzoic acid butyl ester:
125 g. (0.5 mol.) of 2-hydroxy-5-t.-butyl benzoic acid butyl ester, 200 cc. of t.-butanol and 463 g. (5 mol.) of epichlorhydrin are heated to boiling point. Over a period of 35 minutes, a solution of 20 g. of NaOH in 20 cc. of water is added dropwise to the reaction mixture and condensation is continued for 4 hours. The water is distilled off azeotropically, filtered from the common salt and freed from the residual epichlorhydrin. The residue (154 g.) has an epoxide equivalent of 206, and the distilled product, B.P. $_{0.1}$160 to 162° C., has an epoxide equivalent of 163.

(b) 2-epoxypropoxy-5-t.-butyl benzoic acid isooctyl ester.
1132 g. (3.7 mol) of 2-hydroxy-5-t.-butyl benzoic acid isooctyl ester, 1000 cc. of t.-butanol and 3420 g. of epichlorhydrin are heated to boiling point. 150 g. of NaOH in 150 cc. of water are added dropwise to the reaction mixture over 2 hours, condensation takes another 4 hours. The water is distilled off azeotropically, freed from common salt and the excess epichlorhydrin is distilled off. Yield: 1320 g. (~28% of the theoretical), epoxide equivalent 422.

(c) 2-epoxypropoxy benzoic acid isobutyl ester:
776 g. (4 mol) of salicyclic acid isobutyl ester, 1850 g. (22 mol) of epichlorhydrin and 800 cc. of isopropanol are heated to boiling point. A solution of 160 g. (4 mol) of NaOH in 1 litre of water is added over 1 hour and condensation is complete after a further 2 hours. The lower aqueous phase is separated and isopropanol and excess epichlorhydrin are distilled off. The residue is taken up in 800 cc. of benzene, washed with saturated common salt solution, with addition of primary sodium phosphate to give a pH of 5, the aqueous phase is separated and freed from benzene by distillation. The 2-epoxypropoxy benzoic acid isobutyl ester is freed by filtration from the last traces of common salt. Yield: 982 g., epoxide equivalent theoretical 250; found 350.

(d) 2-epoxypropoxy benzoic acid amyl ester:
552 g. (2.6 mol) of salicyclic acid amyl ester, 1200 g. (13 mol) of epichlorhydrin and 520 cc. of isopropanol are heated to boiling point. A solution of 104 g. (2.6 mol) of NaOH in 650 cc. of water is run in over 1 hour: condensation occupies 2 hours more. The lower aqueous phase is separated and isopropanol and excess epichlorhydrin are distilled off. The residue is taken up in 500 cc. of benzene, washed with saturated common salt solution, with addition of primary sodium phosphate to give a pH of 5, the aqueous phase is separated and freed from the benzene by distillation. The 2-epoxypropoxy benzoic acid amyl ester is freed by filtration from the last traces of common salt. Yield: 642 g., epoxide equivalent: theoretical 264; found 372.

*Example 4*

100 parts by weight of a vinylidene chloride/vinyl chloride copolymer containing 80% of vinylidene chloride are worked for 10 minutes with 3 parts by weight of the glycidyl ether of salicyclic acid isobutyl ester on a mixing roll stand heated to 160° C. A smooth rolled sheet which is slightly brownish in colour is obtained. Without the addition, the material decomposes very quickly on the roller without any sheet formation having taken place.

*Example 5*

100 parts by weight of a vinyl chloride/vinyl acetate copolymer containing 13% of vinyl acetate and with a K-value of 50 are worked with 3 parts by weight of the glycidyl ether of salicyclic acid amyl ester for 10 minutes on a mixing roll stand at a temperature of 150° C.

The rolled sheet obtained in crystal clear and shows a slight light brown colouring. An unstabilised specimen, on the contrary, is dark brown in colour.

What is claimed is:

1. In the process for stabilising and plasticising polymers which contain chemically combined chlorine, the improvement which comprises adding as stabiliser and plasticiser glycidyl ethers of hydroxyl aryl carboxylic acid esters of the general formula

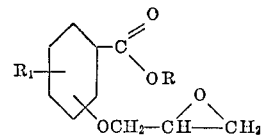

in which R represents hydrocarbon radicals with 4 to 18 carbon atoms and $R_1$ represents a member selected from the group consisting of hydrogen and a hydrocarbon radical with 1 to 4 carbon atoms.

2. Process according to claim 1, wherein a polyvinyl chloride is stabilised.

3. Process according to claim 1, wherein vinylidene chloride/vinyl chloride copolymers are stabilised.

4. Process according to claim 1, wherein p-epoxy propoxy benzoic acid butyl ester is used.

5. Process according to claim 1, wherein p-epoxy propoxy benzoic acid isooctyl ester is used.

6. The composition consisting essentially of 100 parts by weight of a member selected from the group consisting of polyvinyl chloride, polyvinylidene chloride, vinyl chloride/vinyl acetate copolymer, vinylidene chloride/ vinyl chloride copolymer and chlorinated rubber together with from 1–50 parts by weight of a compound of the formula

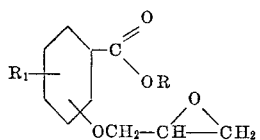

in which R represents hydrocarbon radicals with 4 to 18 carbon atoms and $R_1$ represents a member selected from the group consisting of hydrogen and a hydrocarbon radical with 1 to 4 carbon atoms.

7. The composition of claim 6 wherein from 1–10 parts by weight of said compound of the formula is employed.

8. The composition of claim 6 wherein the compound of said formula is p-epoxy propoxy benzoic acid butyl ester.

9. The composition of claim 8 wherein the selected member is polyvinyl chloride.

10. The composition of claim 8 wherein the selected member is vinyl chloride/vinyl acetate copolymer.

11. The composition of claim 6 wherein the compound of said formula is p-epoxy propoxy benzoic acid iso-octyl ester.

12. The composition of claim 11 wherein the selected member is polyvinyl chloride.

13. The composition of claim 11 wherein the selected member is vinyl chloride/vinyl acetate copolymer.

14. The composition consisting essentially of 100 part by weight of a polymer containing chemically combined chlorine together with from 1–50 parts by weight of a compound of the formula

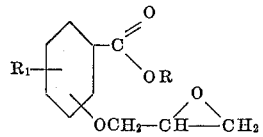

in which R represents hydrocarbon radicals with 4 to 18 carbon atoms and $R_1$ represents a member selected from the group consisting of hydrogen and a hydrocarbon radical with 1 to 4 carbon atoms.

References Cited by the Examiner

UNITED STATES PATENTS

| | | | |
|---|---|---|---|
| 2,758,119 | 8/1956 | Bell | 260—45.8 |
| 3,113,907 | 12/1963 | Tocker | 260—45.85 |

MORRIS LIEBMAN, *Primary Examiner.*